United States Patent [19]

King et al.

[11] Patent Number: 5,745,904

[45] Date of Patent: Apr. 28, 1998

[54] BUFFERED TABLE USER INDEX

[75] Inventors: John Wesley King, Kirkland; Geoffrey Minard Kizer, Seattle; Gregory R. Smith, Bellevue, all of Wash.

[73] Assignee: Microsoft Corporation, Redmond, Wash.

[21] Appl. No.: 586,612

[22] Filed: Jan. 12, 1996

[51] Int. Cl.[6] .................................................. G06F 17/30
[52] U.S. Cl. .......................... 707/200; 707/203; 707/204
[58] Field of Search .................................. 395/601, 608, 395/616, 619, 618; 707/8, 200, 203, 204

[56] References Cited

U.S. PATENT DOCUMENTS

| | | | |
|---|---|---|---|
| 4,648,036 | 3/1987 | Gallant | 364/300 |
| 5,237,661 | 8/1993 | Kawamura et al. | 395/250 |
| 5,333,310 | 7/1994 | Sakai | 395/600 |
| 5,581,754 | 12/1996 | Terry et al. | 395/608 |

*Primary Examiner*—Thomas G. Black
*Assistant Examiner*—Donald Min
*Attorney, Agent, or Firm*—Klarquist Sparkman Campbell Leigh & Whinston, LLP

[57] ABSTRACT

A computer database management system has a table buffer for buffering as yet uncommitted modifications of records in an original shared database table and a look aside index for redirecting original table accesses to the modifications in the table buffer. Record modifications in the table buffer are indexed by a modified value index having a same key structure as a user-defined index on the original table. An indexing logic performs index functions on both the user-defined index and modified value index to provide integrated indexing of the original table records and table buffer modifications with the user-defined key order.

10 Claims, 3 Drawing Sheets

BUFFERED TABLE USER INDEX

FIELD OF THE INVENTION

This invention relates generally to relational database management systems, and more particularly relates to indexing of shared file databases with buffered updates.

BACKGROUND AND SUMMARY OF THE INVENTION

Computer database systems provide a way to store and quickly access information about a group of real world entities or things (e.g., people, products, purchase orders, etc.). Typically, information about each entity in the group is stored in a database as a separate "record" having a plurality of predefined "fields." The data in each field is a value of a predefined data type. For example, a database for a group of people typically includes a record for each person with fields for storing attributes of the person, such as a first name, a last name, a date of birth, a phone number, etc. Databases are commonly stored in a "table" or row/column format (e.g., ".DBF" style database files), where rows of the table represent records of the database and columns represent fields.

Many computer database systems employ independent user index structures (such as the ".CDX" and ".IDX" user index files in Microsoft Corporation's FoxPro® database management system), which are designed to provide flexible and customizable ordering and high-speed access of associated data in the database. In general, these user indexes impose an ordering ("index order") of records according to associated "keys," and provide a mapping between the keys and records in a database. The keys are values created by some aspect of the data in record, e.g., the values in a field or combination of fields in a record. Generally, the index order is either an ascending or descending alpha-numeric order of the keys. Where records with multiple identical keys are allowed, the records with identical keys are further ordered, such as numerically by a record identifier or pointer (which often are assigned in the order that the records are added to the database). In other words, a tie between records with identical keys is broken by the numeric order of their record identifiers.

When a key is input to a user index, the user index outputs a record identifier to a first record of the database in the index order which most closely matches the key according to an index function. Typically, two basic index functions are supported: (1) a fast look-up given a target key, and (2) a "skip" or look-up of a next record in the index order from a current key. For example, in a database where the records represent people, a common user index would be based on the last name (i.e., the key associated with each person's record is the value of the record's last name field). A look-up request on the request key "Smith" thus returns a record identifier for the first record in the index order with a closest matching key to the request key "Smith." (Or the key alphabetically following "Smith" if no record has the key "Smith." A subsequent skip request returns a record identifier for the next record in the index order (the second record with the key "Smith" if more than one record has that key, or the record with a last name key alphabetically following "Smith").

In a computer database system, it is often desirable to allow users to prepare a series of changes to a database at leisure in a sort of "scratch-work space," and later explicitly decide whether to actually make the changes to the database (herein referred to as an "update" operation) or discard the changes (herein referred to as a "revert" operation). This is especially important in a multi-user situation with shared database access (e.g., a client-server network system which allows users at multiple client workstations to access a common database file residing on a file server), where contention between users' changes must be minimized. Such a scratch work space has generally taken the form of a "buffer" or "cache" in which any changed record or row of the database which has been modified by a user is temporarily stored until committed or discarded by the user. Any direct access by a user to a record of the original database which is modified by the user's buffered changes, is redirected (such as by a look-aside index which maps records of the original database to the buffered changes) to instead access the buffered changes in the user's local buffer. Contention between users in a multi-user database system generally is prevented by "locking" records of a shared database which are buffered by one user to prevent access by other users until the buffered records have been either committed or discarded by that user. (Updates in such a manner to a shared database are sometimes referred to as "transactions" in the relational database management system field.)

A problem arises in computer database systems which allow local buffering of a user's uncommitted changes, in that it is also desirable for the user to be able to view or index the database together with the buffered changes as if the buffered changes already are committed. However, since the database has not yet been updated with the buffered changes, the user indexes themselves also should not be modified to also access the buffered changes. The user indexes would otherwise include invalid data (i.e., the database and user indexes would be out of "synch"), and other users also would be able to view or access the buffered changes before the user has decided to commit the buffered changes to the database in an update operation. These user indexes thus provide a "view" of just the database without the user's buffered changes To view the database together with a user's locally buffered changes, it is possible to create a temporary copy of these user indexes and modify the temporary copy so as to allow just the user to index the database together with the buffered changes. The user indexes can then be updated in a subsequent update operation by simply replacing the previous user indexes with the temporary copy. On a revert operation, the temporary copy is discarded. Such a brute force solution, however, has several drawbacks. First, due to the large size of typical user indexes, creating a temporary copy causes unacceptably high overhead on processing and transmission bandwidth resources. Further, to avoid contention with other users, the user indexes would have to be locked while any one user's buffered changes are still pending.

On the other hand, whereas the physical and logical structure of database table files typically allows piecemeal, on-the-fly redirection to locally buffered changes, the physical and logical structure of the user indexes generally makes such piecemeal, on-the-fly redirection impractical. In the case of the database itself, records are requested by their position (e.g., row number) in the database's table structure. When records are modified, their position in the table does not change. For example, changing the last name field of the record in row nine of a table from "Smith" to "Jones," does not cause the record to move from row nine. It is therefore possible to locally buffer changes to the record in row n of the table, then redirect requests for the record in row n to the buffered changes with a look aside index that simply maps row n to the buffered changes. A request for the record at row n is simply redirected by the look aside index to the buffered changes.

In the case of the user indexes, however, the physical structure and ordering of data in the user indexes depends on the data itself. Thus, the change in the above example of the last name field of a record from "Smith" to "Jones" effectively causes a reorganization of any user index for keys based on the last name field of the records. The physical structure of the user index must now be changed so that the entry which maps the key for this record is now in a different place to reflect the change in the index order. Further, the user indexes depend on this physical structure to provide high speed index functions. For this reason, unlike database tables, it is impractical to simply "patch" particular positions of the user indexes by locally buffering changes to the data at those positions and redirect accesses to data at those positions to the locally buffered changes.

Due to these drawbacks, it has not been possible in typical prior computer database systems for a user to modify multiple records of a shared database and access the database with the modifications according to a user index before committing the changes in an update operation.

The present invention is a computer database system and method which allows local buffering of changes to a database and indexing of the database as modified by the buffered changes before the changes are committed. The invention utilizes a buffer to store records of the database that are modified by the user, and a look-aside index to map between the records of the database and the modified records. A temporary index having the same key structure as a user index on the database is created with entries for the modified records in the buffer. A look-aside indexing logic performs index functions on both the user index and the temporary index, and compares the results to yield the appropriate unmodified record in the database or modified record in the buffer according to the index function for a request key. Since the temporary index has the same key structure as the user index, this transparently integrates the database and the user's changes with the same customized ordering and look-up functions as provided by the user index for the database alone. This also exploits the high-speed indexing advantages of the user index structure. Further, since the buffer and temporary index contain only information for records that are modified by the user, unnecessary duplication of the database and user index is avoided.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
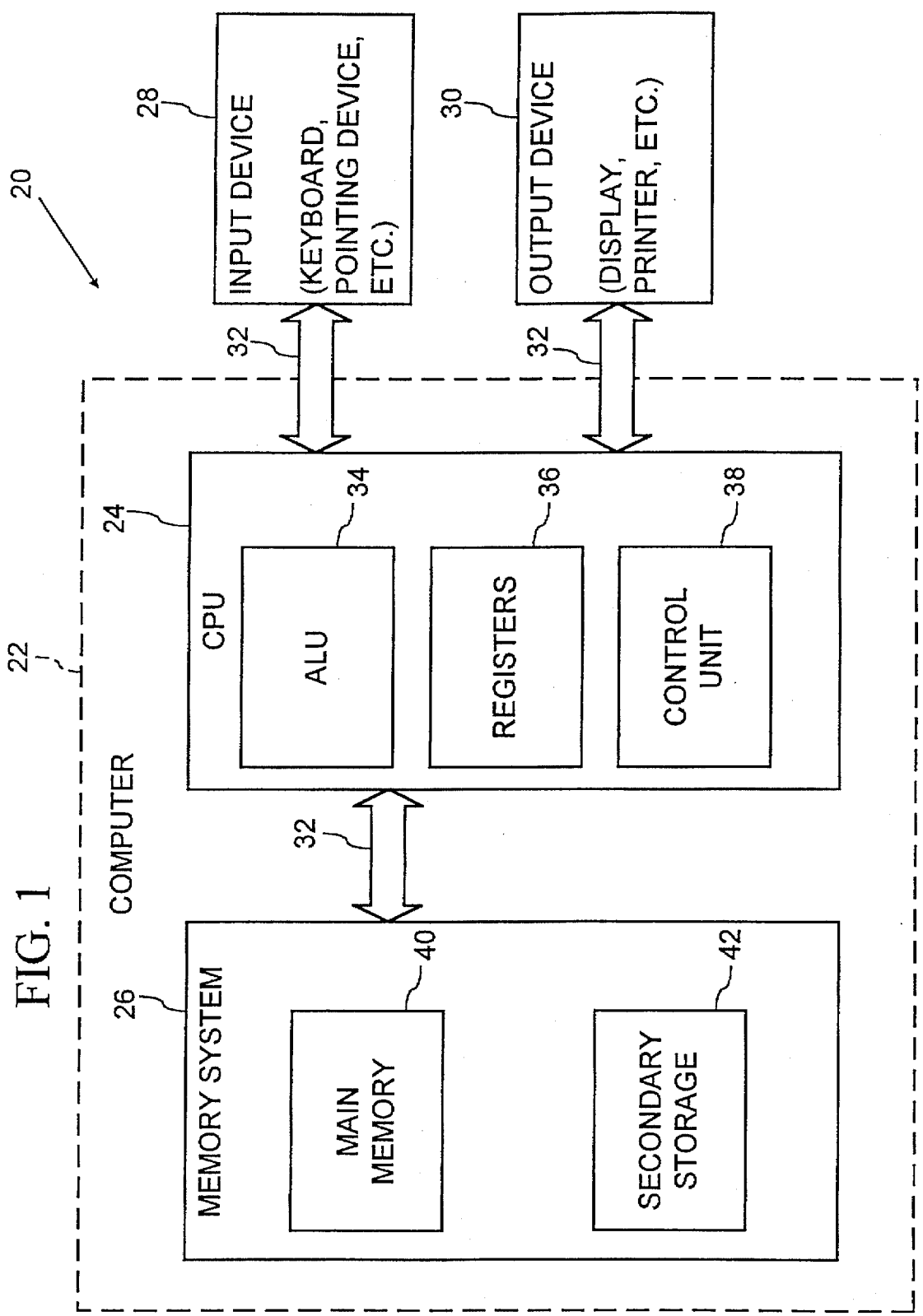
FIG. 1 is a block diagram of a computer system that may be used to implement a method and apparatus embodying the invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
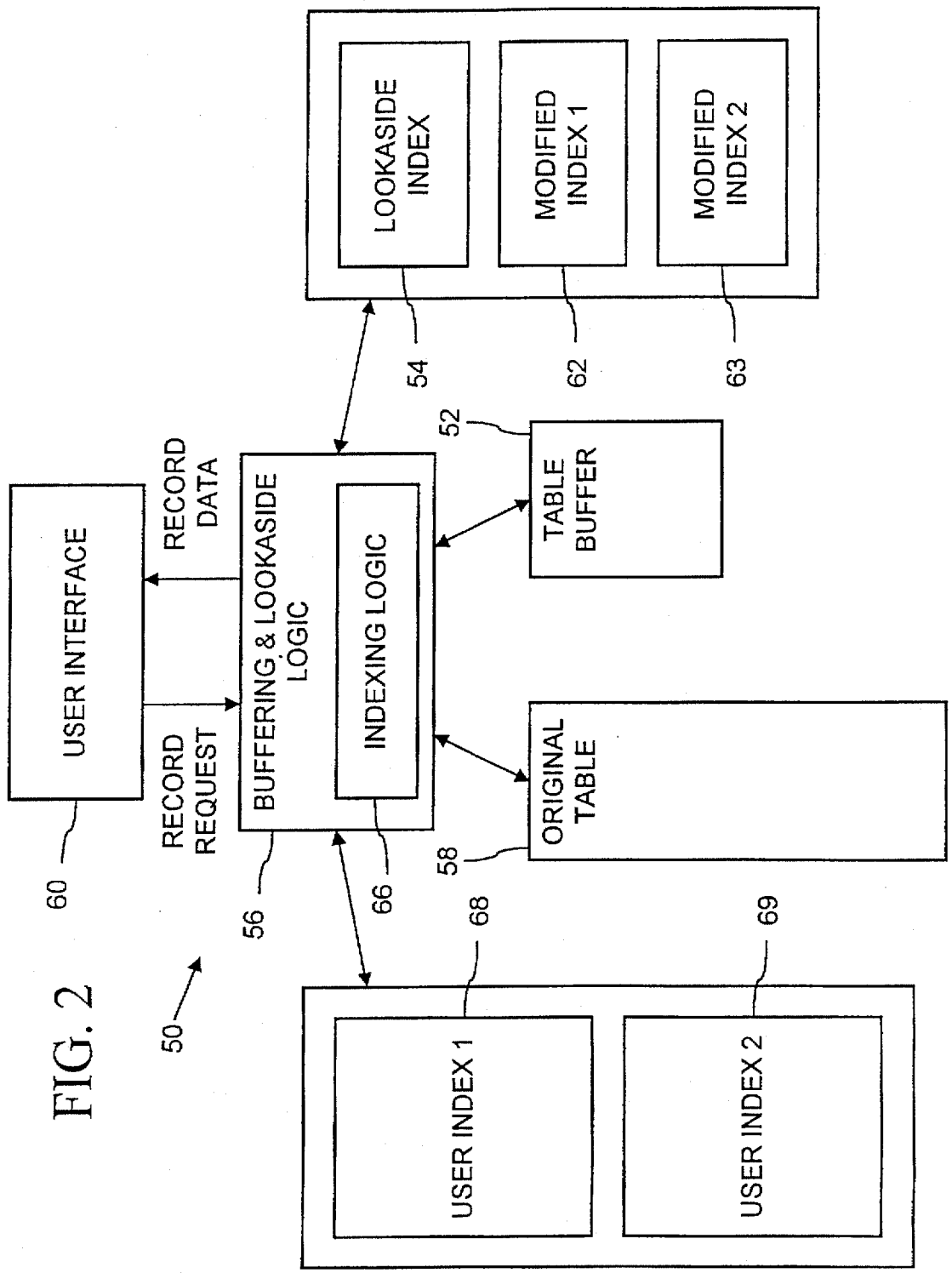
FIG. 2 is a block diagram of a database management system within a computer system such as shown in FIG. 1 and having a buffered table user index according to an illustrated embodiment of the invention.

In a computer database management system 50 according to the illustrated embodiment of the invention shown in FIG. 2, a table buffer 52, a look aside index 541 and a buffering and look aside logic 56 provide buffering of a user's changes to an original table 58. The database management system 50 also comprises a user interface 60 for interacting with the user. In general, the user interface 60 accepts user input from the input device or devices 28 (FIG. 1) (e.g., a keyboard and mouse) and outputs to the output device or devices 30 (FIG. 1) (e.g., a display screen) at a user's computer system (e.g., computer system 50 of FIG. 1). The user interface 60 includes a user interface control (e.g., a menu command, check box, button or like selection input control) for alternatively setting buffering by the database management system 50 either on or off. The user interface 60 also includes editing tools for the user to modify data from the original table 58, and user interface controls for indexing and displaying the data.

The original table 58 is a database which preferably is stored in a row/column table format where rows of the table represent records of the database and columns represent fields of the records. In the illustrated embodiment, the table 58 is a shared database file which is resident on a file server computer system and accessed by a user at a client computer system via a computer network. Alternatively, the table 58 can be resident in a user's computer system. The records in the original table 58 are associated with original table record identifiers. In the illustrated embodiment, the original table record indentifiers are record numbers which number the records in an order that they were added to the original table 58. In alternative embodiments, pointers or other values which uniquely identify the records of the original table 58 can serve as the original table record identifiers.

The table buffer 52 preferably also is a database having a row/column table format. The table buffer 52 is created when the user sets buffering on, and is initially empty. After buffering is set to on, the database management system 50 stores into the table buffer 52 any records of the original table 58 that are modified by the user with the editing tools provided in the user interface 60. The modified records of the table buffer 52 also are associated with table buffer record identifiers. In the illustrated embodiment, the table buffer record identifiers are record numbers which number the modified records in the order that they are added to the table buffer 52. Alternatively, pointers or other values which serve to indicate the records in the table buffer can instead be used as the table buffer record identifiers. The table buffer 52 itself is not visible (i.e., is not displayed) to the user, but is rather an internal data structure of the database management system 50.

The look aside index 54 maps records of the original table 58 to modified records of the table buffer 52. The look aside index 54 also is created when the user sets buffering on, and is initially empty. When a modified record is added to the table buffer 52, the database management system 50 also adds an entry to the look aside index 54 which associates an original table record identifier of the record in the original table 58 being modified with a table buffer record identifier for the modified record in the table buffer 52. The look aside index 54 further includes a lookup function which accepts an original table record identifiers and returns its associated table buffer record identifier in the look aside index entries, if any, or a negative response (e.g., an end-of-file ("EOF") value).

The buffering and look aside logic 56 is a handler for redirecting accesses to records of the original table 58 that have been modified to records of the table buffer 52. When the user sets "buffering on," the buffering and look aside logic 56 checks the look aside index 54 whenever records of the original table 58 are accessed, such as when the user "opens" or requests display of a particular record with the user interface 60. By checking the look aside index 54, the database management system 50 thus can determine whether a record in the original table 58 is modified and find the corresponding modified record in the table buffer 54. If the look aside index 54 returns an EOF value for an input original table record identifier, then the associated record of the original table 58 has not been modified and is displayed by the user interface 60. If the look aside index 54 returns a table buffer record identifier, then the record of the original table 58 associated with the original table record identifier is modified by the modified record in the table buffer 52 associated with the table buffer record identifier. The user interface 60 then displays the modified record whose table buffer record identifier is returned by the look aside index 54.

The database management system 50 also comprises a set of modified value indexes 62–63 and a look aside logic 66 (a component of the buffering and look aside logic 56) for transparently indexing the table buffer 52 with the original table 58 using a same customized ordering and fast look-up features as provided by a set of user indexes 68–69 on the original table 58. The user indexes 68–69 impose an ordering (the "key order") on the records of the original table 58 based on user-defined keys, which are values created by some aspect of the data in each record (e.g., values of a selected field or combination of fields). (In a shared, multi-user database, a database management system administrator typically defines the keys of the user indexes.)

The illustrated user indexes 68–69 are implemented as binary tree data structures and code modules (e.g., functions or procedures) which accept a request key, and return an original table record identifier of a record in the original table 58 that most closely matches the request key according to an index function. The index functions supported in the illustrated user indexes 68-69 include find, skip and rewind functions. The find function is a fast lookup of a first record according to the key order of the user index, whose key most closely matches the request key. The skip function returns a next record according to the key order following a currently selected record of the original table 58. The rewind function returns the first or top record according to the key order in the original table 58. In alternative embodiments of the invention, other index structures which accept a request key and return a value indicative of a record of the original table which most closely matches the request key in a user-defined key order according to an index function can suitably be used for the user indexes 68–69. The index functions supported by the user indexes in alternative embodiments of the invention also can vary from the find, skip and rewind functions supported by the illustrated user indexes.

For each of the user indexes 68–69 on the original table 52, the database management system 50 creates a separate modified value index 62–63 on the table buffer 52 having a same user-defined key structure as the corresponding user index. These modified value indexes 62–63 are initially empty. Then, as records modified by the user are added to the table buffer 52, the database management system 50 also adds key entries to the modified value indexes 62–63. For convenience, in the illustrated database management system 50, these key entries of the modified value indexes 62–63 map the user defined keys of the modified records to those records' respective original table record identifiers (as opposed to their table buffer record identifier). For example, for an original table which is a database of people and a user index whose user-defined key is the last name, the database management system 50 creates a modified value index also having the last name as its user-defined key. If the last name in a record with original table record identifier "3" is changed from "Sharp" to "Sharpe," then an entry is added to the modified value index which maps the last name "Sharpe" to original table record identifier "3" (i.e., the modified value index returns the original table record identifier "3" for a look-up on the request key "Sharpe").

The look aside logic 66 operates as a special handler for index function requests invoked while "buffering on" is set by the user. Normally, when the user sets "buffering off," the database management system 50 performs index function requests invoked by the user through the user interface 60 with the user indexes 68–69 alone. When the user invokes index function requests with buffering on, the look aside logic 66 takes over by forwarding the index function request to both a user index 68–69 and its corresponding modified values index 62–63, and comparing the results to yield the appropriate record identifier for the requested index function. The look aside logic 66 and the other blocks shown in FIG. 2 are typically implemented as data structures and a module of code for a set of related functions.

Figure 3:
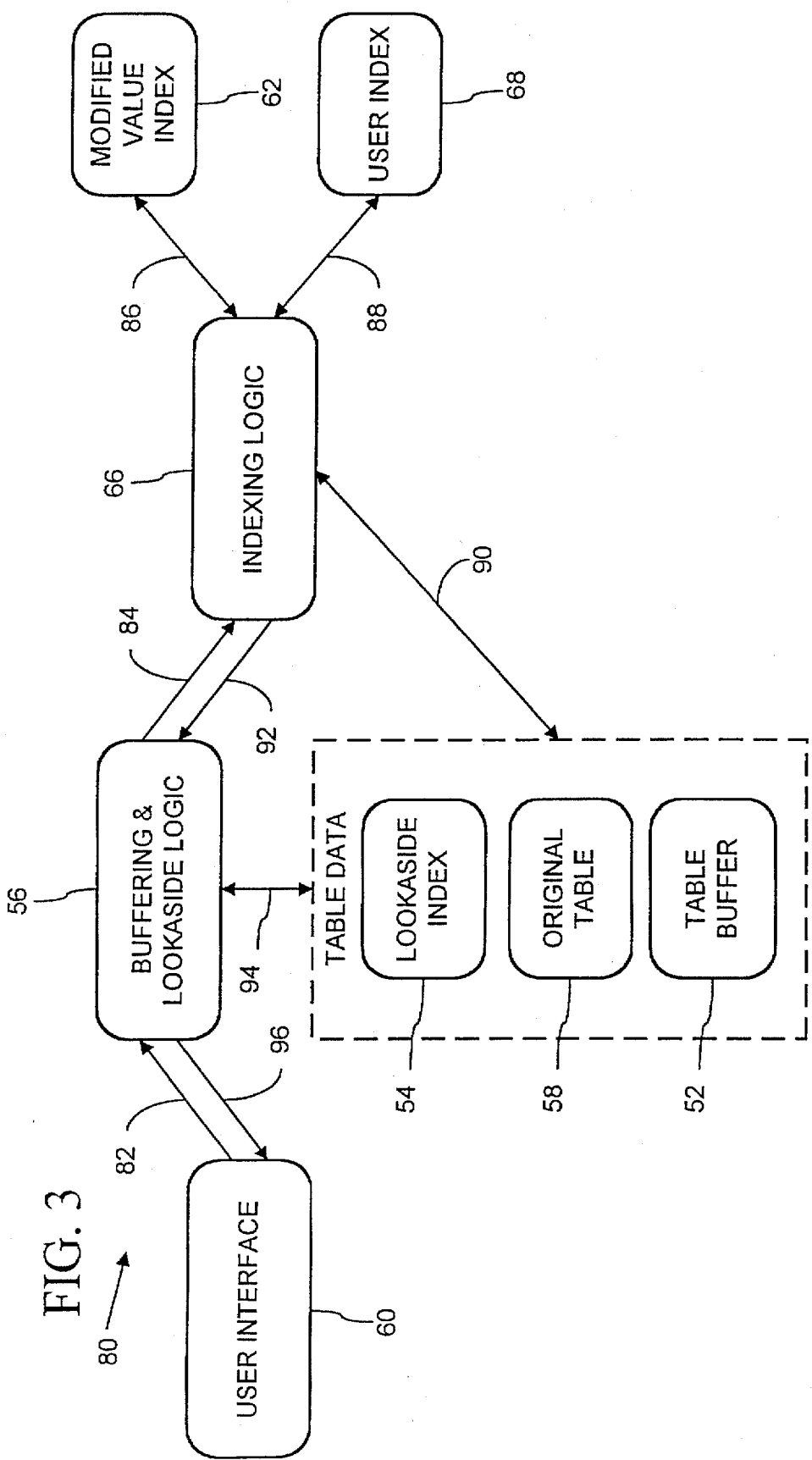
FIG. 3 is a control flow diagram of the buffered table user index of FIG. 2.

More particularly, with reference to FIG. 3, the database management system 50 performs the index function request invoked by the user with "buffering on" as illustrated by a control flow operation 80. As illustrated at arrow 82, the user interface 60 initiates the index function request when the user activates a user interface control to either explicitly (e.g., by selecting a "find" or "skip" menu command) or implicitly (e.g., by moving a record pointer control on an index-ordered table display) invoke the index function request. The user interface 60 sends the user's index function request to the buffering and look aside logic 56.

The buffering and look aside logic 56 determines whether the user has set "buffering on" or "buffering off." If "buffering off" is set, the index function request is handled normally by forwarding directly to the appropriate user index 68–69. (Specifically, when indexing by a last name key, the index function request is forwarded to the user index whose user-defined key is the last name.) If "buffering on" is set, the index function request is forwarded to the indexing logic 66 as indicated at arrow 84.

As indicated at arrow 86, the indexing logic 66 first forwards the index function request to the appropriate modified value index 62 (for example, the modified value index whose key is the last name if indexing by the last name). In response, the modified value index 62 returns a record identifier indicative of a modified record in the table buffer 52 that satisfies the requested index function (i.e., the record is the closest match to a request key according to an index function specified by the index function request). As described above, the record identifier is actually an original table record identifier which is mapped by the look aside index 54 (FIG. 2) to the respective modified record in the table buffer 52 that satisfies the index function specified by the index function request. If the table buffer 52 is empty, such as when no modifications have yet been made, the modified value index 62 returns a negative or EOF result.

As indicated at arrow 88, the indexing logic 66 also forwards the index function request to the appropriate user index 68 (again, for example, the user index whose key is the last name if indexing by the last name). In response, the user index 68 returns a record identifier indicating a record in the original table 58 that satisfies the requested index function (i.e., the record which is the closest match to the request key according to the index function specified by the index function request). As indicated at arrow 90, the indexing logic 66 tests the record identifier returned by user index 68 against the look aside index 54 to determine if the record indicated by the record identifier is currently being buffered (i.e., a modified version of the record is stored in the table buffer 52). If the record is being buffered, the indexing logic 66 repeatedly sends a "skip" request to the user index 68, and checks the returned record identifier with the look aside index 54 until a record identifier for an unbuffered (i.e., unmodified) record is returned (or the user index 68 returns an EOF result indicating all records in the key order have been checked).

The indexing logic 66 then compares the final results from both the modified value index 62 and the user index 68. If the final result from either the modified value index 62 or the user index 68 is a negative or EOF result, then the record identifier returned by the other index is accepted as the correct result of the index function request. Otherwise, the indexing logic 66 retrieves the full keys of the records indicated by the two final result's record identifiers, and compares these to the request key of the index function. The record identifier of the record whose full key comes closest in the key order to the request key is accepted as the correct result of the index function request. If the two full keys are equal, then the lower of the original table record identifiers is accepted as the correct result of the index function request. (For a descending alpha-numeric key order, the higher of the original table record identifiers can instead be accepted as the correct result of the index function request.) As indicated at arrow 92, the indexing logic 66 returns this result to the buffering and look aside logic 56.

The buffering and look aside logic 56 then accesses the record indicated by the original table record identifier returned from the indexing logic 66 as indicated at arrow 94. Since both the user indexes 68–69 and the modified value indexes 62–63 return original table record identifiers, the buffering and look aside logic 56 can access the record as in a direct table access, without further qualification. The buffering and look aside logic 56 first sends the original table record identifier to the look aside index 54 to check whether its associated record has been modified and thus is stored in the table buffer. If the look aside index 54 returns a table buffer record identifier, the buffering and look aside logic 56 retrieves the modified record indicated by that table buffer record identifier from the table buffer 52. If the look aside index returns an EOF value, then the buffering and look aside logic 56 retrieves the record indicated by the original table record identifier from the original table 58. As indicated at arrow 96, the buffering and look aside logic 56 then returns the record to the user interface 60 for display or presentation to the user.

As an example, an example original table has four records with original table record identifiers and a last name field of: (1) "Silver;" (2) "Sanders;" (3) "Sharp;" and (4) "Sutton." An example user index using the last name field as its defined key contains entries in an ascending alphabetical key order of "Sanders"⇨(2), "Sharp"⇨(3) "Silver"⇨(1), and "Sutton"⇨(4). The user sets "buffering on," and changes the last name field of record (3) from "Sharp" to "Sharpe." As a result, the database management system 50 creates a table buffer, a look aside index and a modified value index with the same key structure as the user index. The database management system then adds a record with a table buffer record identifier of (1) to the table buffer, adds an entry relating (3)⇨(1) to the look aside index, and adds an entry relating "Sharpe"⇨(3) to the modified value index.

The user then invokes a "find" index function request specifying a request key of "Sharp." As shown in FIG. 3, this request is passed to the indexing logic 66 which sends the request to both the user index and the modified value index. In response, the modified value index returns an original table record identifier of (3). The user index also returns an original table record identifier of (3), but the look aside index shows that this record identifier is buffered. The indexing logic 66 then sends a "skip" request to the user index which returns the original record identifier (1) for the next record in the key order (i.e., with key "Silver"). The look aside index shows that this record is not buffered. Since the indexing logic 66 now has an original table record identifier result from both the user index and the modified value index, it retrieves the full keys from these records which are "Sharpe" and "Silver," respectively. Since "Sharpe" is closest in the index order to the request key "Sharp," the indexing logic 66 returns that record's original table record identifier (3) to the buffering and look aside logic 56. The buffering and look aside logic 56 determines from the look aside index that original table record identifier (3) is buffered as table buffer record identifier (1). So, the logic 56 retrieves the record with table buffer record identifier (1) from the table buffer and returns its data to the user interface for display to the user.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer database management system, comprising:
   a database table containing a plurality of data records;
   a table buffer containing any currently uncommitted modifications to the data records of the database table;
   a user index for performing any of a set of index functions on the database table and returning a result value indicative of a data record out of the data records in the database table which results from that index function;
   a modifications index for performing any of a set of index functions on the table buffer and returning a result value indicative of a modified data record out of the modifications in the table buffer which results from that index function;
   a user interface control for invoking a user-requested index function; and
   an index handler responsive to the user interface control for causing the user index and the modifications index to perform the user-requested index function and for retrieving a resulting data record indicated by a selected one of the result values returned by the user index and the modifications index that satisfies the user-requested index function.

2. The computer database management system of claim 1 wherein the user index has a user-defined key structure for ordering the data records of the database table and contains entries relating key values of the data records to record identifiers indicative of the data records, and the modifications index orders the modifications in the table buffer according to the same user-defined key structure and contains entries relating key values of the modifications to record identifiers indicative of the modifications.

3. The computer database management system of claim 2 further comprising:
   a look aside index for verifying which of the data records in the database table are modified by the modifications in the table buffer; and
   the index handler being operative to cause the user index to perform the user-requested index function and additional skip index functions and to cause the look aside index to verify whether the data record indicated by the result values returned by the user index are modified until the user index returns a result value that indicates an unmodified data record.

4. The computer database management system of claim 1 wherein the set of index functions performed by the user index and by the modifications index comprises at least a find index function and a skip index function,
   wherein the find index function yields a first record value indicative of a best matching record according to the user-requested index function, and the skip index function yields a second record value indicative of a next record according to a key order.

5. In a computer database management system having a database table with a set of original data records and a user index on the database table with a user-defined key structure, a method of extending the user index to also index buffered modifications of the data records, the method comprising the steps of:
   buffering modifications by a user of a set of modified data records out of the original data records in the original table into a table buffer;
   creating a modifications index on the table buffer having the same user-defined key structure as the user index;
   performing a user-requested index function on the modifications index to yield a first result value indicative of a best matching record according to the user-requested index function out of the modified data records;
   performing at least one index function on the user index to yield a second result value indicative of a best matching record according to the user-requested index function out of the original data records not in the set of modified data records, the at least one index function comprising the user-defined index function; and
   comparing a full key of each of the best matching records indicated by the first and second result values to yield a resulting record that satisfies the user-requested index function.

6. The method of claim 5 wherein the step of performing the at least one index function on the user index comprises the steps of:
   performing the user-defined index function on the user index to yield a first record value indicative of a best matching record according to the user-requested index function out of the original data records;
   verifying whether the record indicated by the first record value is in the set of modified data records;
   accepting the first record value as the second result value if the record indicated by the first result value is not in the set of modified data records; and
   if the record indicated by the first record value is in the set of modified data records, then:
      (a) performing a skip index function on the user index to yield a second record value indicative of a next record out of the original data records according to a key order,
      (b) verifying whether the record indicated by the second record value is in the set of modified data records;

(c) repeating steps (a) and (b) until the record indicated by the second record value is not in the set of modified data records; and (d) accepting the second record value as the second result value.

7. The method of claim 5 further comprising the steps of:

setting a buffering on condition in response to input from a user to a user interface control; and creating the table buffer and the modifications index in response to the buffering on condition being set.

8. A computer-readable medium having computer-executable instructions for performing the steps recited in claim 5.

9. A computer-readable medium having computer-executable instructions for performing the steps recited in claim 6.

10. A computer-readable medium having computer-executable instructions for performing the steps recited in claim 7.

* * * * *